United States Patent [19]

Matsen et al.

[11] Patent Number: 5,530,227
[45] Date of Patent: Jun. 25, 1996

[54] METHOD AND APPARATUS FOR CONSOLIDATING ORGANIC MATRIX COMPOSITES USING INDUCTION HEATING

[75] Inventors: Marc R. Matsen; Paul S. Gregg; Howard Martinson, all of Seattle; Robert Snyder, Kent, all of Wash.

[73] Assignee: The Boeing Company, Seattle, Wash.

[21] Appl. No.: 169,655

[22] Filed: Dec. 16, 1993

Related U.S. Application Data

[63] Continuation-in-part of Ser. No. 777,739, Oct. 15, 1991, Pat. No. 5,410,132, Ser. No. 151,433, Nov. 12, 1993, Pat. No. 5,420,400, and Ser. No. 92,050, Jul. 15, 1993, Pat. No. 5,410,135, which is a division of Ser. No. 681,004, Apr. 5, 1991, Pat. No. 5,229,562.

[51] Int. Cl.⁶ ........................................ H05B 6/10
[52] U.S. Cl. .................... 219/633; 219/603; 219/645; 219/659; 264/403; 264/486
[58] Field of Search .................... 219/633, 602, 219/603, 618, 632, 633, 634, 635, 645, 639; 425/174.8 E, 297; 428/212, 236; 156/153; 264/25, 10.2

[56] References Cited

U.S. PATENT DOCUMENTS

| | | | |
|---|---|---|---|
| 2,273,609 | 2/1942 | Wrighton et al. | 219/633 |
| 3,574,031 | 4/1971 | Heller et al. | 219/633 |
| 3,661,491 | 5/1972 | Troyer | 425/297 |
| 3,705,284 | 12/1972 | Binard | 219/634 |
| 4,060,364 | 11/1977 | Gras | 425/174 |
| 4,150,927 | 4/1979 | Steingroever | 425/3 |
| 4,524,037 | 6/1985 | Marc | 264/26 |
| 4,544,339 | 10/1985 | Itoh | 425/174.8 R |
| 4,555,373 | 11/1985 | Bloemkolk et al. | 264/25 |
| 4,622,445 | 11/1986 | Matsen | 219/615 |
| 4,637,199 | 1/1987 | Steck et al. | 219/633 |
| 4,649,249 | 3/1987 | Odor | 219/659 |
| 4,657,717 | 4/1987 | Cattanach et al. | 264/10.2 |
| 4,716,072 | 12/1987 | Kim | 428/212 |
| 4,824,617 | 4/1989 | Takeuchi et al. | 264/26 |
| 4,855,011 | 8/1989 | Legge et al. | 156/583.1 |
| 4,906,172 | 3/1990 | Stewart | 425/174.4 |
| 5,032,327 | 7/1991 | Becheret | 264/26 |
| 5,047,605 | 9/1991 | Ogden | 219/633 |
| 5,139,407 | 8/1992 | Kim et al. | 425/174.8 E |
| 5,229,562 | 7/1993 | Burnett et al. | 219/602 |
| 5,410,132 | 4/1995 | Gregg et al. | 219/604 |
| 5,410,133 | 4/1995 | Matsen et al. | 219/645 |

*Primary Examiner*—Tu Hoang
*Attorney, Agent, or Firm*—Christensen, O'Connor, Johnson & Kindness

[57] ABSTRACT

A method and apparatus for forming and consolidating organic matrix composites. An organic matrix composite panel comprising laid-up prepregs is placed between sheets of a susceptor material that is susceptible to inductive heating to form a workpiece. The resulting workpiece is placed within upper and lower dies formed of a material that is not susceptible to inductive heating. An induction coil embedded within the dies is energized and inductively heats the susceptor sheets surrounding the panel. The sheets in turn conductively heat the organic matrix composite panel. A pressure zone between the workpiece and one of the dies is pressurized to form the workpiece to the contour of a forming surface on one of the dies. The pressure in the pressure zone is maintained on the workpiece until the organic matrix composite panel is fully consolidated and formed.

20 Claims, 8 Drawing Sheets

METHOD AND APPARATUS FOR CONSOLIDATING ORGANIC MATRIX COMPOSITES USING INDUCTION HEATING

This is a continuation-in-part of U.S. patent application Ser. No. 07/777,739 filed Oct. 15, 1991, now U.S. Pat. No. 5,410,132 and of U.S. patent application Ser. No. 08/151,433, filed Nov. 12, 1993, now U.S. Pat. No. 5,420,400 and of U.S. patent application Ser. No. 08/092,050 filed Jul. 15, 1993, now U.S. Pat. No. 5,410,135, which in turn is a divisional of U.S. patent application Ser. No. 07/681,004, filed Apr. 5, 1991, now U.S. Pat. No. 5,229,562. The benefit of the filing dates of which are claimed under 35 U.S.C. § 120; these applications and patent are incorporated by reference.

FIELD OF THE INVENTION

The present invention relates to the consolidation and forming of organic matrix composites, more specifically, the present invention relates to methods and apparatus for inductively heating, forming and consolidating resins to make organic matrix composites.

BACKGROUND OF THE INVENTION

Fiber-reinforced resin (i.e., organic matrix) composite materials have become widely used, have a high strength-to-weight or high stiffness-to-weight ratio, and desirable fatigue characteristics that make them increasingly popular in weight, strength or fatigue critical applications.

Prepregs consisting of continuous, woven, or chopped fibers embedded in an uncured matrix material are cut to the desired shape and then stacked in the desired configuration of the composite part. The prepreg may be placed (laid-up) directly upon a tool or die having a forming surface contoured to the desired shape of the completed part or the prepreg may be laid-up in a flat sheet and the sheet may be draped over a tool or die to form to the contour of the tool.

After being laid-up, the prepreg is consolidated (i.e., cured) in a conventional vacuum bag process in an autoclave (i.e., a pressurized oven). The pressure presses the individual layers of prepreg together at the consolidation/curing temperatures that the matrix material flows to eliminate voids and cures, generally through polymerization.

In autoclave fabrication, the composite materials must be bagged, placed in the autoclave, and the entire heat mass of the composite material and tooling must be elevated to and held at the consolidation or curing temperature until the part is formed and cured. The formed composite part and tooling must then be cooled, removed from the autoclave, and unbagged. Finally, the composite part must be removed from the tooling.

To supply the required consolidation pressures, it is necessary to build a special pressure box within the autoclave or to pressurize the entire autoclave, thus increasing fabrication time and cost, especially for low rate production runs.

Autoclave tools upon which composite materials are laid-up are typically formed of metal or a reinforced composite material to insure proper dimensional tolerances and to withstand the high temperature and consolidation forces used to form and cure composite materials. Thus, autoclave tools are generally heavy and have large heat masses. The entire heat mass of the tool must be heated along with the composite material during curing and must be cooled prior to removing the completed composite part. The time required to heat and cool the heat mass of the tools adds substantially to the overall time necessary to fabricate a single composite part.

In composite parts requiring close tolerances on both the interior and exterior mold line of the part, matched autoclave tooling must be used. When matched tooling is used, autoclave consolidation pressure is used to force the matched tooling together to consolidate the composite material and achieve proper part dimensions. Matched tooling is more expensive than open faced tooling and must be carefully designed to produce good results, adding to part fabrication costs.

An alternative to fabricating composite pans in an autoclave is to use a hot press. In this method, the prepreg is laid-up, bagged (if necessary), and placed between matched metal tools that include forming surfaces that define the internal and external mold lines of the completed part. The tools and composite material are placed within the press and then heated. The press brings the tools together to consolidate and form the composite material into the final shape. Fabricating composite parts in a hot press is also expensive due to the large capital expense and large amounts of energy required operate the press and maintain the tools.

Generally, in hot press operations, to obtain close tolerances, the massive, matched tooling is formed from expensive metal alloys having low thermal expansion coefficients. The tooling is a substantial heat sink that takes a large amount of energy and time to heat to composite material consolidation temperatures. After consolidation, the tooling must be cooled to a temperature at which it is safe to remove the formed composite part thus adding to the fabrication time.

Another contributor to the cost of fabricating composite parts is the time and manpower necessary to lay up individual layers of prepreg to form a part. Often, the prepreg must be laid up over a tool having fairly complex contours that require each layer of prepreg to be manually placed and oriented. Composite fabrication costs could be reduced if a flat panel could be laid-up flat and then formed into the shape of the part.

One method used to reduce the costs of fabricating composite materials is to lay up a flat panel and then place the flat panel between two metal sheets capable of superplastic deformation as described in U.S. Pat. No. 4,657,717. The flat composite panel and metal sheets are then superplastically deformed against a metal die having a surface contoured to the final shape of the part. Typically, the dies used in such superplastic forming operations are formed of stainless steel or other metal alloys capable of withstanding the harsh temperatures and pressures. Such dies have a large thermal mass that takes a significant amount of time and energy to heat up to superplastic forming temperatures and to cool down thereafter.

Attempts have been made to reduce composite fabrication times by actively cooling the tools after forming the composite part. These attempts have shortened the time necessary to produce a composite part, however, the time and energy expended in tool heat up and cool down remains a large contributor to overall fabrication costs.

The present invention is a method and apparatus for consolidating and forming organic matrix composites that avoid some of the above-identified disadvantages of the prior art.

SUMMARY OF THE INVENTION

The present invention is a method and apparatus for consolidation of organic matrix composites using inductive heating. In the present invention, the dies or tooling for the organic matrix composite parts are made from a material that is not susceptible to inductive heating. Examples of usable tool materials are ceramics or resin composites. The tooling is strengthened and reinforced with fiberglass rods or other appropriate reinforcements to withstand the temperatures and pressures used to form the composite materials. Such materials decrease the cost of tool fabrication and also generally reduce the thermal mass and weight of the tooling. Since the tooling used in the present invention is not susceptible to inductive heating, it is possible to use the tooling in combination with inductive heating elements to heat the composite material. The present invention allows the composite material to be inductively heated without heating the tools significantly. Thus, the present invention can reduce the time and energy required to fabricate a composite part.

Graphite or boron reinforced organic matrix composites may be sufficiently susceptible because of their reinforcing fibers that they can be heated directly by induction. Most organic matrix composites require a susceptor in or adjacent to the composite material to achieve the necessary heating. The susceptor is heated inductively and transfers its heat to the composite material.

The present invention reduces the time and energy required to consolidate resin composite prepreg lay-ups for a composite. Because induction focuses the heat on the workpiece rather than the tool, there is less mass to heat or cool. Inexpensive composite or ceramic tooling can also be used. The lower operating temperature of the tools decreases problems caused by different coefficients of thermal expansion between the tools and the workpiece in prior art forming systems. The present invention also provides an improved method for fabricating composite parts to close tolerances on both the internal and external mold line of the part.

In a method for consolidating/or and forming organic matrix composite materials, an organic matrix composite panel is laid up and then placed adjacent a metal susceptor. The susceptor is inductively heated and then heats the composite panel by thermal conduction. A consolidation and forming pressure is applied to consolidate and form the organic matrix composite panel at its curing temperature.

Generally, the composite panel is enclosed between two susceptor sheets that are sealed to form a pressure zone around the composite panel. This pressure zone is evacuated in a manner analogous to convention vacuum bag processes for resin consolidation. The workpiece (the two susceptors and composite panel) is placed in an inductive heating press on the forming surfaces of dies having the desired shape of the molded composite part, and is pressed at elevated temperature and pressure (while maintaining the vacuum in the pressure zone) to consolidate the composite panel into its desired shape.

The workpiece may include three susceptors sealed around their periphery to define two pressure zones. The first pressure zone surrounds the composite panel and is evacuated and maintained under vacuum. The second pressure zone is pressurized to help form the composite panel.

One preferred apparatus for consolidating and forming the organic matrix composite panels uses ceramic or composite dies. An induction coil is embedded in the dies. When the coil is energized with a time varying current, induction heats the susceptors which in turn heats the composite panel by conduction. Pressure is applied to at least one side of the composite panel to consolidate and form it when it reaches the desired consolidation temperature.

It is preferred to use reinforced, cast phenolic or ceramic dies. Reinforcing rods are embedded within the dies to increase their strength by compressing the dies. The phenolic or ceramic dies may be reinforced with chopped reinforcing fibers, with a mat or weave of continuous fibers or with other reinforcements. The die usually includes a cavity adapted to receive a tool insert. The tool insert may include a forming surface that defines the shape of the molded composite part. In this way, different pans can be made simply by changing the insert rather than needing to replace the entire die.

DETAILED DESCRIPTION OF THE PREFERRED EMBODIMENT

Figure 1:
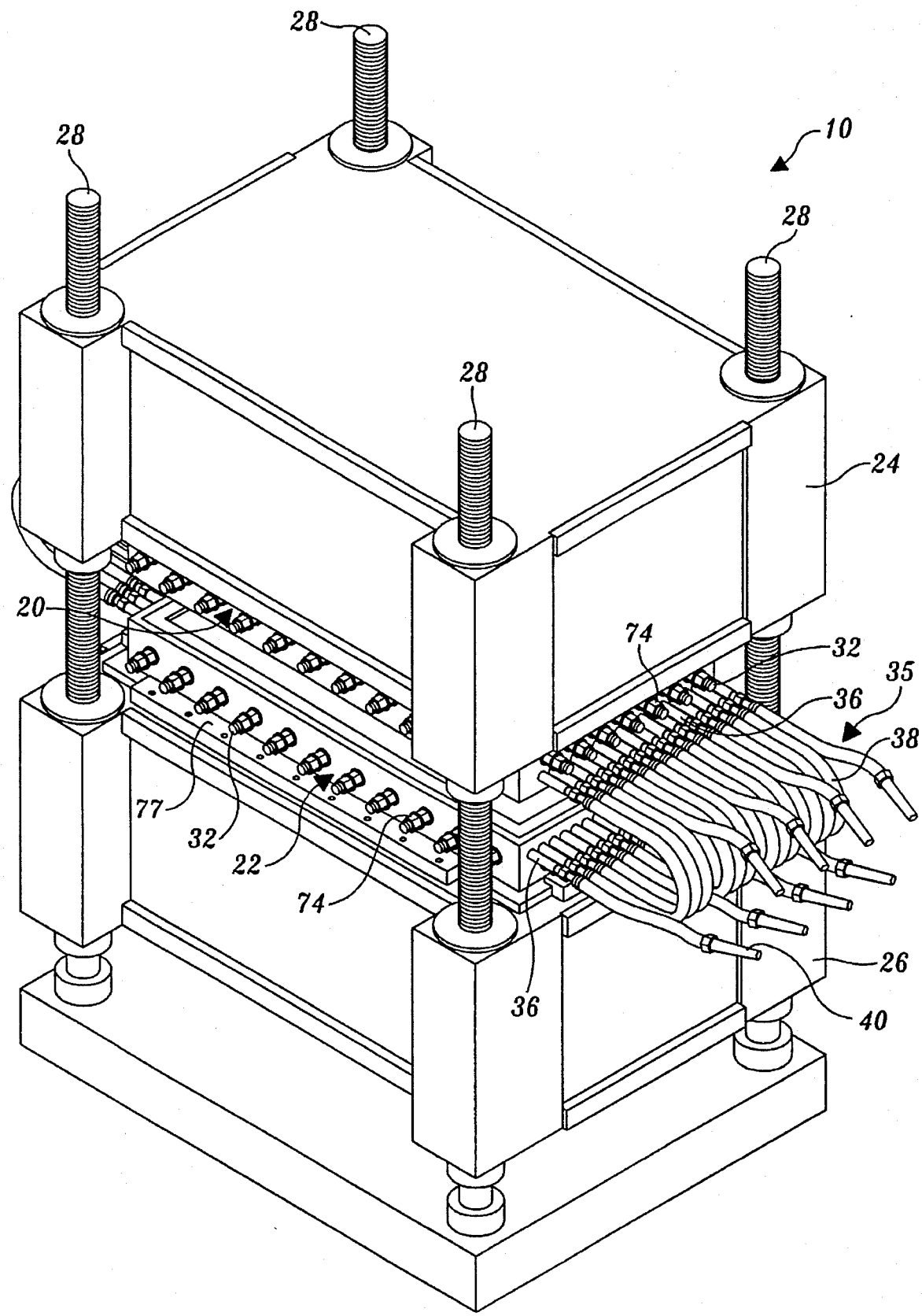
FIG. 1 is a perspective view of an apparatus for consolidating and forming organic matrix composite panels.

In FIG. 1, the inductive heating and forming apparatus 10 includes tools or dies 20 and 22 mounted within an upper 24 and a lower 26 strongback, respectively. The strongbacks are each threaded onto four threaded column supports or jackscrews 28. The jackscrews can be turned using a bellows or other actuation mechanisms to move the upper strongback or lower strongback up or down in relation to each other.

Each strongback 24 and 26 provides a rigid, flat backing surface for the upper and lower die 20 and 22 to prevent the dies from bending and cracking during repeated consolidation and forming operations. Preferably, the strongbacks should be capable of holding the dies to a surface tolerance of +/−0.003 inches per square foot of the forming surface in the toolbox. Such tolerances help to insure that proper part tolerances are achieved. The strongbacks may be formed of steel, aluminum, or any other material capable of handling the loads present during forming. However, materials that are nonmagnetic such as aluminum or some steel alloys are preferred to avoid any distortion to the magnetic field produced by the induction coils described below. In some circumstances, the dies may be strong enough without the strongbacks.

Figure 5:
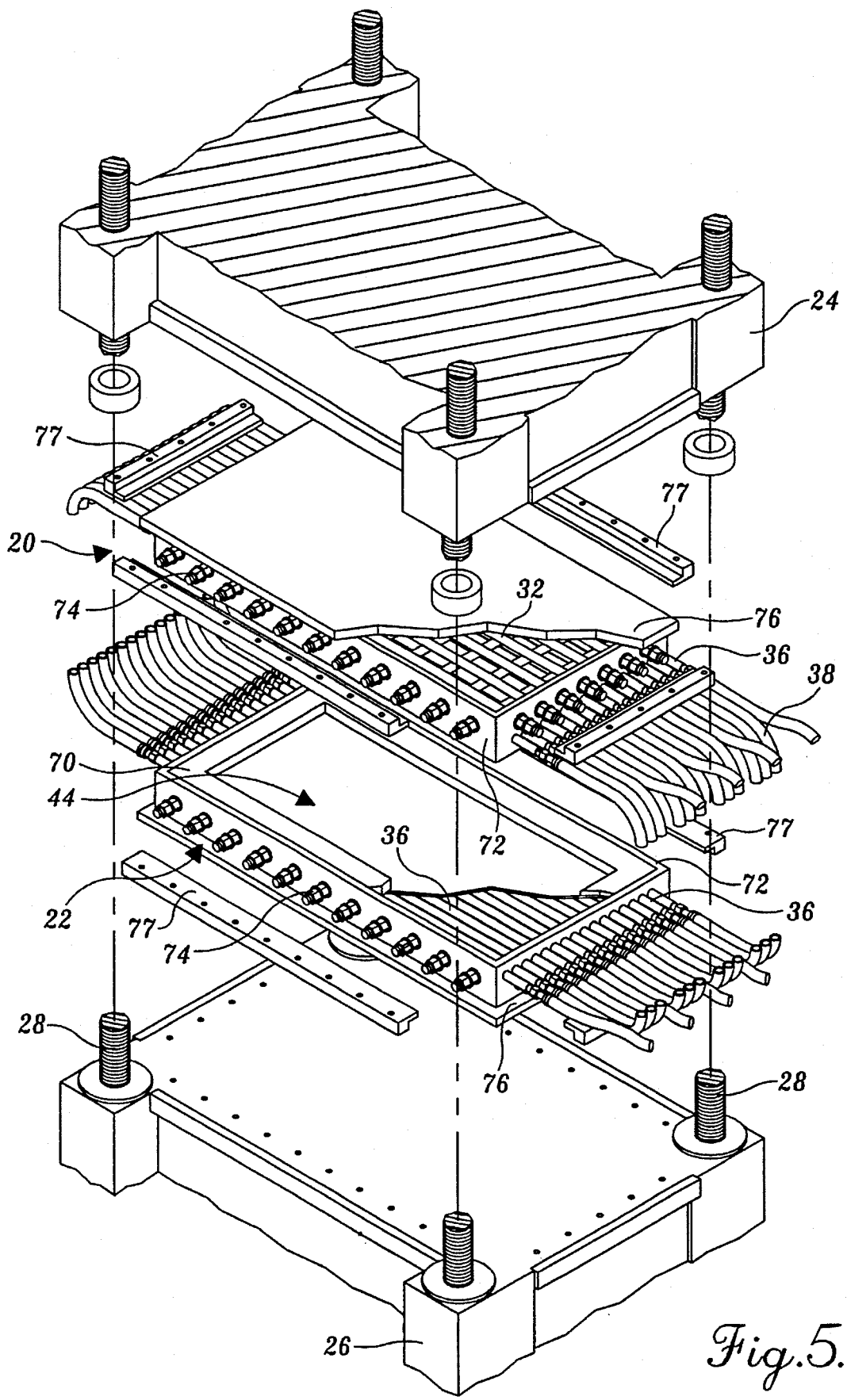
FIG. 5 is a partially exploded, partially cut away view of a portion of the apparatus of FIG. 1.

Both the upper 20 and lower 22 dies hold inserts 46 and 48 (FIGS. 2 and 5) and are reinforced with a plurality of fiberglass rods 32 (FIG. 5) that extend both longitudinally and transversely in a grid through each die. Each die may be attached to its strongback by any suitable fastening devices such as bolting or clamping. In the preferred embodiment, both dies are mounted on support plates 76 (FIG. 5) which are held in place on the respective strongbacks through the use of clamping bars 77 (FIGS. 1 and 5). The clamping bars 77 extend around the peripheral edges of the support plates 76 and are bolted to the respective strongbacks through the use of fasteners (not shown).

The dies are not susceptible to inductive heating. A composite or ceramic material that has a low coefficient of thermal expansion, good thermal shock resistance, and relatively high compression strength is preferred such as a castable fused silica ceramic.

A plurality of induction coils 35 (FIG. 1) extend longitudinally through the length of the upper and lower dies. In the preferred embodiment, four separate induction coils 35 are used, however, other numbers of induction coils could also be used. Each induction coil 35 is formed from a straight tubing section 36 that extends along the length of each die and a flexible coil connector 38 that joins the straight tubing sections 36 in the upper die 20 to the straight tubing sections in the lower die 22. The induction coils 35 are connected to an external power source or coil driver 50 and to source of coolant by connectors 40 located at the ends of the inductive coils.

A composite panel is formed from prepreg laid-up on a contoured surface of a tool and is secured within the upper 20 and lower 22 dies as described in detail below. The upper 24 and lower 26 strongbacks and thus upper 20 and lower 22 dies are then brought together. The composite panel is then inductively heated to the consolidation temperature to promote resin flow and polymerization, as described in greater detail below.

Cavities 42 and 44 (FIG. 2), respectively, in the dies are sized to hold an upper 46 and a lower 48 tool insert. The upper tool insert 46 includes a contoured forming surface 58 that has a shape corresponding to the desired shape of the outer mold line surface of the composite part to be formed. The lower tool insert determines the inner mold line. The tool inserts generally are not susceptible to inductive heating. In the preferred embodiment, the tool inserts are formed of a castable dielectric phenolic or ceramic.

The tool inserts could be formed as an integral part of the dies. The separate die and tool insert configuration shown is preferred because it allows different tool inserts having different forming surfaces to be used in the same dies, simplifying the replacement task for changing the tooling and reducing the tooling costs.

Each die surrounds and supports the respective tool insert and holds the straight sections 36 of the induction coils in proper position in relationship to the tool insert. In the preferred embodiment, the interior 70 of the dies is formed of a castable phenolic or ceramic and the exterior sides of the toolboxes are formed from precast composite phenolic resin blocks 72. In some applications, it is preferable to reinforce the phenolic or ceramic resins with chopped fibers or nonwoven or woven reinforcing mats.

To increase the strength of the phenolics or ceramics fiberglass reinforcing rods 32 are used. The rods 32 extend both longitudinally and transversely through the precast blocks 72 and the interior 70 and are then post-tensioned through the use of tensioning nuts 74 after casting the interior 70. Post-tensioning the reinforcing rods 32 maintains a compressive load on the blocks 72, interior 70 and the tool inserts to maintain the tolerances of the upper and lower tool inserts and to prevent cracking or damage of the dies are tool inserts during consolidation and forming operations.

The straight tubing sections 36 of the induction coils 35 are embedded within the dies, and extend parallel to the bottom surface of the respective tool inserts. The induction coils may be contained within the tool inserts.

Figure 2:
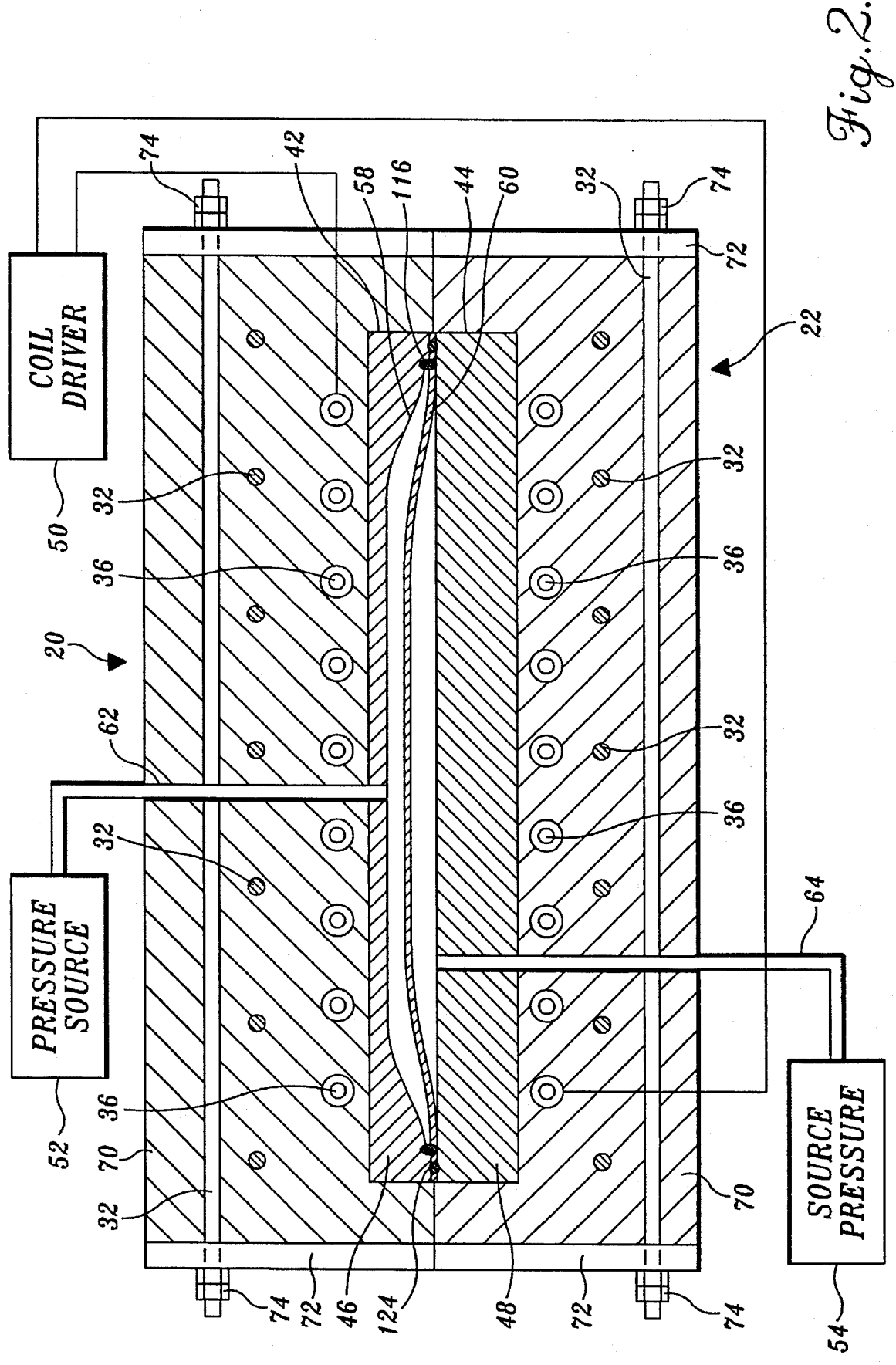
FIG. 2 is a schematic cross-sectional view of the apparatus of FIG. 1.

In FIG. 2, a workpiece 60 including an organic matrix composite panel is shown already laid-up and placed between the upper 46 and lower 48 tool inserts. The detailed structure of the workpiece will be described in detail below. The workpiece 60 is heated to a forming and consolidation temperature by energizing the coils 35.

When the workpiece 60 reaches the consolidation temperature at which the matrix flows, gas pressure is applied to the workpiece by pressure sources 52 and 54. Pressure source 52 provides a pressure to the upper surface of the workpiece 60 through a conduit 62 that passes through the upper die 20 and upper tool insert 46, while pressure source 54 applies a pressure to the lower surface of the workpiece 60 through a conduit 64 that passes through the lower die 22 and lower tool insert 48.

In FIG. 2, the composite workpiece 60 is shown partially deformed upwardly toward the forming surface 58. The pressure applied to the workpiece 60 is maintained until the workpiece has formed to the contour of the forming surface 58 and the matrix resin has consolidated. The pressure sources 52 and 54 may apply an equal or a differential pressure to both the upper and lower surfaces of the workpiece 60.

Pin holes (not shown) may be formed in the upper and lower tool inserts to vent gas trapped between the workpiece 60 and the forming surface 58 as the workpiece deforms. Such pin holes can be coupled to a flow meter to monitor the progress of the workpiece's deformation.

When the workpiece 60 is formed and consolidated, the induction coils 35 are de-energized, and the pressure relieved. The upper 46 and lower 48 tool inserts and upper 20 and lower 22 dies are separated. The composite part is removed.

Inductive heating is accomplished by providing an alternating electrical current to the induction coils 35 within which the workpiece is positioned. This alternating current produces an alternating magnetic field in the vicinity of the inductive coils that heats the workpiece via eddy current heating.

Figure 3:
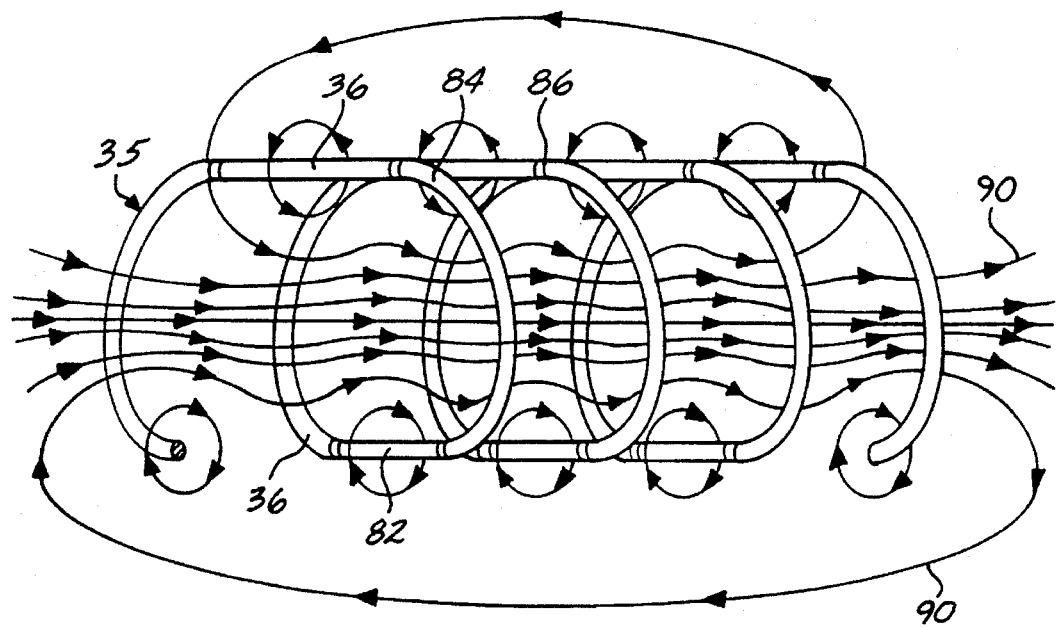
FIG. 3 is a perspective view illustrating the induction coil.

Curved sections 84 extending between the straight sections 36 (FIG. 4) in the coils 35 are flexible, to accommodate the opening and closing of the upper 20 and lower 22 dies. The curved sections 84 and straight sections 36 are joined at fittings 86 into one or more induction coils or helixes to produce a magnetic field schematically illustrated by field lines 90 in FIG. 3. Each straight section 36 and curved section 84 preferably comprises a copper tube having an interior longitudinal passage 96 through which a cooling fluid (such as water) may be pumped to cool the coils during operation.

Figure 4:
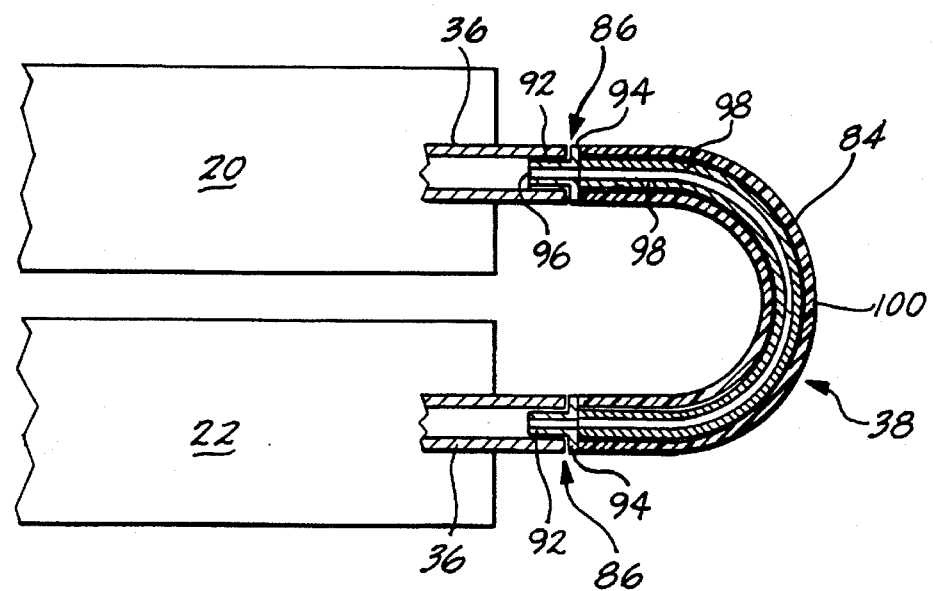
FIG. 4 is a cross-sectional view of a flexible coil connector.

FIG. 4 illustrates a preferred construction for each curved section 84. Each curved section includes a pair of fittings 86, each of which includes a relatively small diameter section 92 dimensioned to fit snugly within a straight section 36, and a larger diameter flange 94. The flange 94 regulates the distance the fittings 86 extend into the straight sections 36. The passage 96 extends through each fitting 86, each curved section 84, and each straight section 36.

A braided flexible conductor 98 extends through passage 96 and is joined between flanges 94 by a suitable method such as brazing or soldering. Finally, a flexible, insulating jacket 100 is placed around the conductor 98 and extends between the flanges 94 to contain the conductors and cooling fluid. One commercial vendor through which a suitable design cable can be obtained is Flex-Cable located at Troy, Mich.

The frequency at which the coil driver 50 (FIG. 2) drives the coils 35 depends upon the nature of the workpiece 60. Current penetration of copper at 3 kHz. is approximately 0.06 inches, while penetration at 10 kHz. is approximately 0.03 inches. The shape of the coil also has a significant effect upon the magnetic field uniformity. Field uniformity is important because temperature uniformity in the workpiece is directly affected by the uniformity of the magnetic field. Uniform heating insures that different portions of the workpiece will reach the forming and consolidation temperature of the composite material at approximately the same time. Solenoidal type induction coils provide a uniform magnetic field, and are therefore preferred. Greater field uniformity is produced in a workpiece that is symmetric around the center line of the induction coil. The additions of variations, such as series/parallel induction coil combinations, variable turn spacings and distances between the part and the induction coil can be established by standard electrical calculations.

Dielectric materials for the tool inserts and dies are generally thermally insulating. Thus, the tool inserts and dies tend to trap and contain heat within the workpiece. Since the dies and tool inserts are not inductively heated, and act as insulators maintaining heat within the workpiece, the present invention requires far less energy to form and consolidate the composite panel than conventional autoclave or resistive hot press methods.

The forming operation of the present invention also takes much less time than prior art forming operations because time is not expended elevating the large thermal mass of either the dies or tool inserts prior to forming and consolidating the composite panel. Only the workpiece itself is heated by the coils. Thus, forming temperatures are achieved more rapidly and when the driver 50 is de-energized, the dies and the workpiece cool rapidly to a temperature at which the part may be removed, saving time and energy. In addition, the thermal cycle is not limited by the heating and cooling cycle of the equipment and tools so the thermocycle may be better tailored to the material used.

Figure 7:
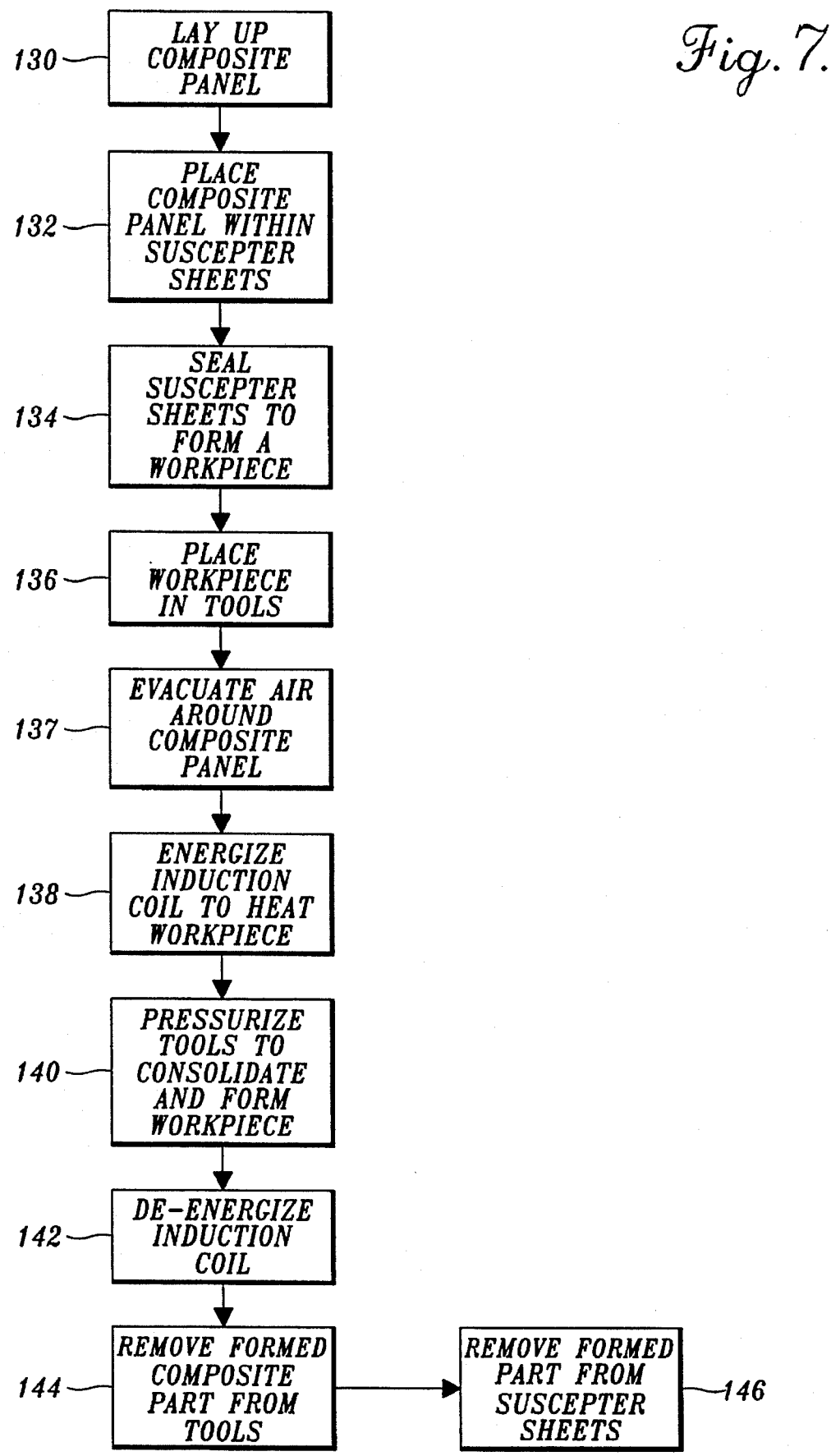
FIG. 7 is a flow chart showing an embodiment of the method of consolidation and forming of the present invention.

In FIG. 7, block 130, a composite panel 110 is laid-up from individual layers of prepreg. The composite panel 110 is placed between a first sheet 112 and second sheet 114 of a susceptor (block 132) to form a workpiece. The susceptors are welded around the periphery thus forming a pressure zone 117 between the susceptors surrounding the composite panel 110. The resulting workpiece is then placed within the upper 46 and lower 48 tool inserts, block 136.

The periphery of the workpiece, including the area containing the sealing weld 116, is clamped between the edges of the upper 46 and lower 48 tool inserts to form a pressure zone 119 between the lower tool insert 48 and the workpiece 60 and a pressure zone 120 between the upper tool insert 46 and the workpiece 60.

In cases where the lower tool insert 48 is formed of a material that is somewhat porous, it is advantageous to place a third susceptor 122 between the lower tool insert 48 and the first sheet 112 to serve as a pressure barrier between the workpiece 60 and the lower tool insert 48. When a third susceptor 122 is used, it is also advantageous to weld it to the first sheet 112 around the periphery at weld 116, thus forming the pressure zone 119 between the first sheet 112 and third sheet 122 as opposed to between the first sheet 112 and the lower tool insert 48. In order to ensure that the periphery of the upper and lower tool inserts are sealed it is also advantageous to use an O-ring seal 124 around the periphery of the upper and lower tool inserts.

After placing the workpiece between the upper 46 and lower 48 tool inserts and bringing the tool inserts together to form pressure zones 117, 119 and 120, the air from within the pressure zone 117 surrounding the composite panel 110 is evacuated (block 137). Pulling a vacuum around the composite panel 110 helps to reduce voids in the completed composite pan. Pulling a vacuum in the pressure zone 117 also helps to ensure that the first sheet 112 and second sheet 114 remain tightly against the composite panel 110 during consolidation and forming which in turn helps to prevent wrinkles and flaws in the surface of the completed part.

After pulling a vacuum in pressure zone 117, the coils 35 are energized by the coil driver 50 with a time varying electrical field (block 138) to heat the susceptors inductively to the forming and consolidation temperature of the composite panel 110. Heat is transferred by conduction into the composite panel 110, so it too reaches consolidation temperature.

Figure 6A:
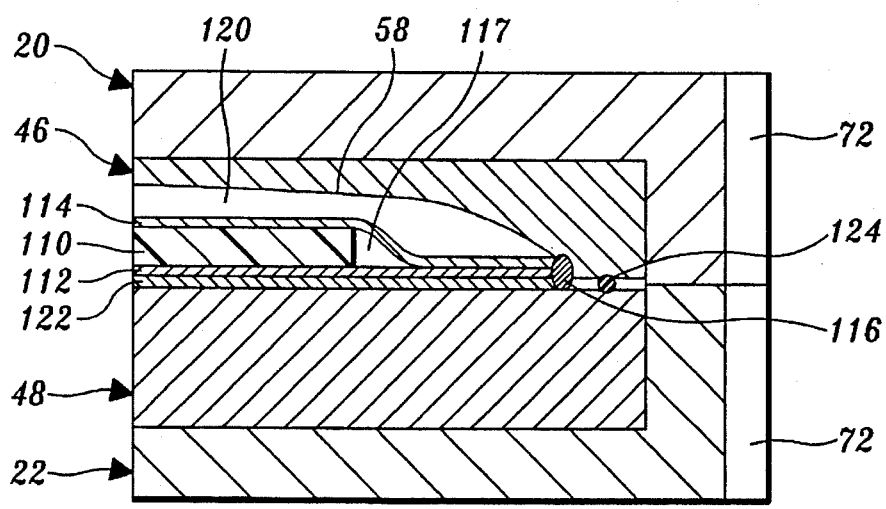
FIG. 6A is an enlarged cross-sectional view of pan of an organic matrix composite panel after it has been placed within the tooling but before consolidation and forming has begun.
Figure 6B:
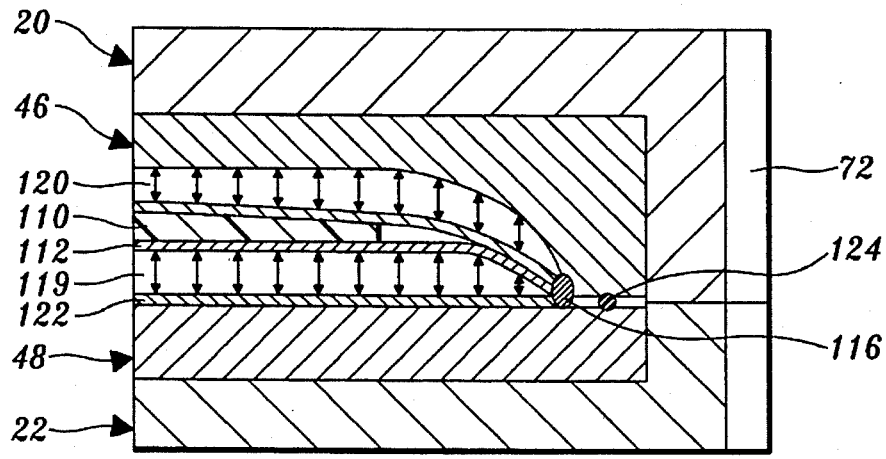
FIG. 6B is an enlarged cross-sectional view of pan of an organic matrix composite panel after consolidation and forming has begun.
Figure 6C:
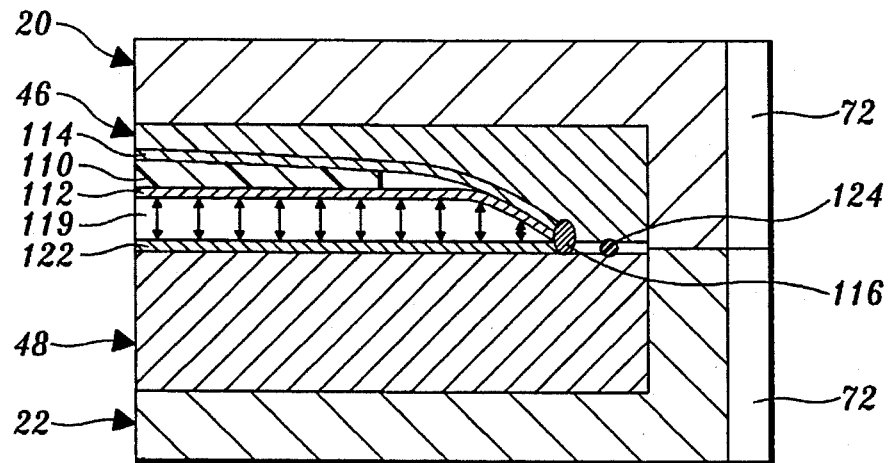
FIG. 6C is an enlarged cross-sectional view of pan of an organic matrix composite panel after consolidation and forming has been completed.

Pressure zone 119 is pressurized (block 140) to force the susceptors and composite panel 110 upwardly, as shown in sequential FIGS. 6A-C, until the upper surface of the workpiece conforms to the forming surface 58 of the upper tool insert. The pressure within the pressure zone 119 is maintained until the composite panel 110 has fully formed and consolidated.

During forming, it may be advantageous to pressurize the pressure zone 120 between the upper tool insert 46 and the second sheet 114. Pressurizing pressure zone 120 places a force on the workpiece which helps to consolidate the composite panel 110 and regulates the rate at which the workpiece deforms. In some applications, it may be advantageous to pressurize and maintain pressure zones 119 and 120 at the same pressure for a period of time to help consolidate the composite panel 110 prior to the forming procedure. As the forming procedure begins, the pressure in pressure zone 120 can then be maintained slightly lower than the pressure in pressure zone 119 or can be decreased over time to allow the pressure in pressure zone 119 to deform the workpiece upwardly into contact with the forming surface 58. In the preferred embodiment, it has been found advantageous to form the susceptors from aluminum or an aluminum alloy.

After completing consolidation, the induction coils 35 are shut off and the workpiece and tool inserts are allowed to cool to a temperature at which the formed composite panel 110 may be removed from the tool inserts and first 112 and second 114 sheets (blocks 142–146). The composite panel 110 may be removed from the tool inserts by unwelding, cutting open or otherwise separating the first 112 and second 114 sheets. Although there is some heat transfer between the workpiece and the tool inserts, it is insufficient to heat the tool inserts or dies substantially.

In one example of composite consolidation and forming in accordance with the present invention, a composite panel formed of 48 layers of thermoplastic PEEK/IM6 prepreg ⅜ inch thick was consolidated and formed (PEEK stands for poly-ether-ether-keytone). Three aluminum sheets having a thickness of 1/16 inch were placed around the composite panel and the resulting workpiece was placed in the tool inserts and inductively heated to a temperature of 720° F. by induction heating in five minutes time. The panel was maintained at 720° F. for two minutes and then cooled for twenty minutes. Pressure zone 119 was then pressurized to approximately 250 psi while pressure zone 117 was vented to atmospheric pressure. The pressure zone 120 was not pressurized. The pressure in pressure zone 119 was maintained for 22 minutes to consolidate and cure the composite panel. The times and pressures described above are for representative purposes only and would differ depending upon the composite material used and the thickness and complexity of the formed part.

The present invention is applicable to all types of organic matrix composites that is not limited to the example discussed above. For example, the present invention may be used to consolidate/cure both thermal setting and thermal plastic composites including epoxies, bismaleimide and polyimides.

Figure 8:
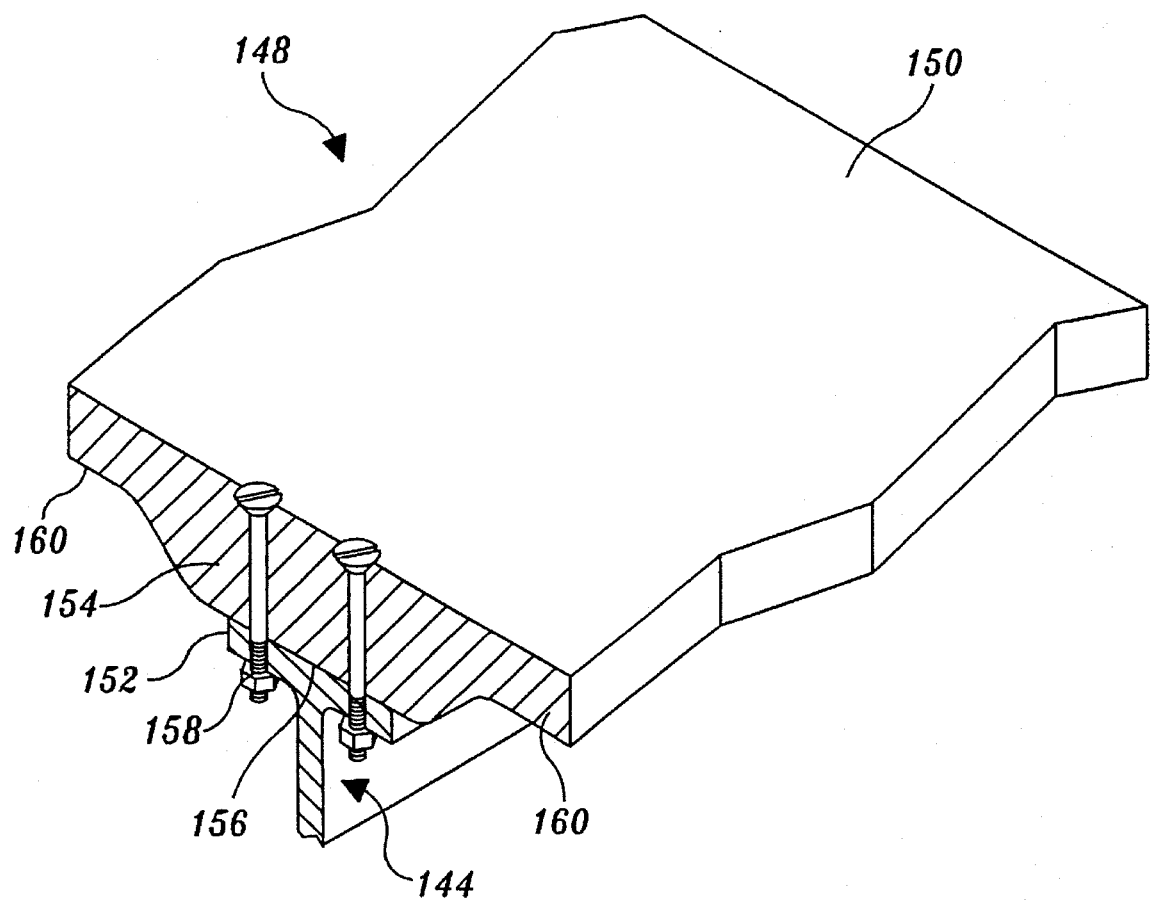
FIG. 8 is a partial perspective view of an organic matrix composite part including a close tolerance attachment section.

Another problem with prior art composite forming and consolidation procedures has been difficulty in forming a close tolerance outer mold line while also maintaining a close tolerance inner mold line on a composite part. In FIG. 8, the tolerances of the outer mold line surface 150 of the wing skin 148 must be closely maintained to ensure that an efficient aerodynamic surface is achieved. The tolerances of the inner mold line surface 152 of the wing skin must also be maintained at a close tolerance in a buildup area 154 where the wing skin is joined to a spar 144 to ensure that the wing skin 148 and spar 144 can be joined together along joining surface 156 through the use of fasteners 158 without the use of shims. It is not as critical to control the inner mold line surface in areas 160 where the wing skin is not attached to other structures.

Figure 9:
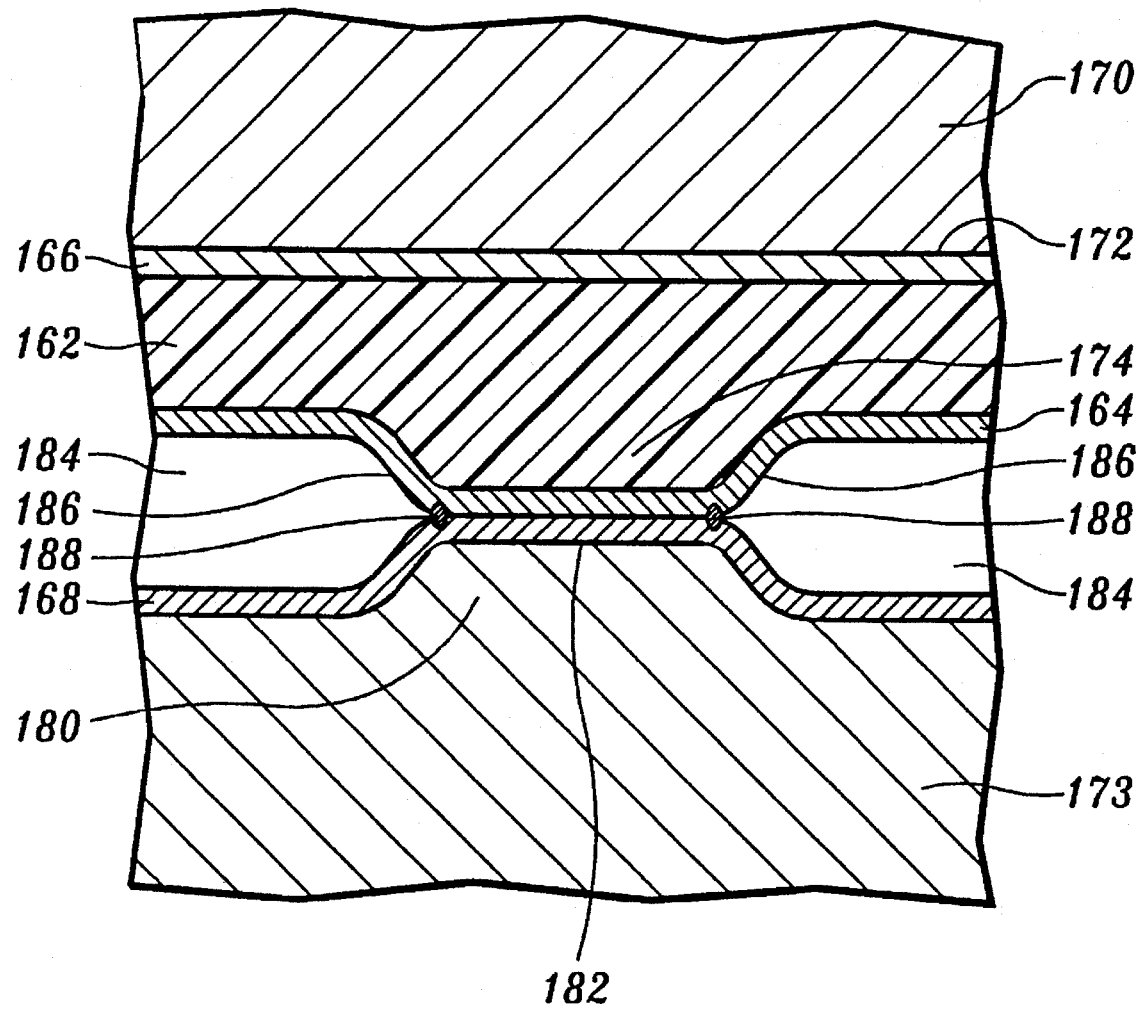
FIG. 9 is an enlarged cross-sectional view of tooling for forming a close tolerance section in a part using matched tooling.

As shown in FIG. 9, composite panel 162 is placed within three sheets 164, 166, and 168 to form a workpiece that is placed within upper and lower tool inserts 170 and 173, respectively. The composite panel includes a buildup area 174 having additional layers of prepreg so that the buildup area is thicker than the surrounding composite panel. Additional layers of prepreg are used in the buildup area to reinforce the composite panel in the area where the spar 144 (FIG. 8) is to be attached.

Similar to the preferred embodiment, the upper tool insert 170 includes a forming surface 172 that is contoured to define the outer mold line of the composite panel 162 after it is formed. The lower tool insert 173 includes a raised portion 180 whose upper surface 182 defines the lower surface of the workpiece after forming. The raised portion 180 is spaced a proper distance from the buildup area 174 to maintain a close tolerance on the interior mold line surface of the composite panel 162 in the buildup area 179 during forming and consolidation.

The pressure zone formed between sheets 164 and 166 is evacuated. The induction coils are energized to inductively heat the sheets and, thus, composite panel 162. The pressure zone 184 formed between sheets 164 and 168 is then pressurized to force the workpiece upwardly into contact with the forming surface 172 and to exert hydrostatic force on the sides 186 of the buildup area 174 to help maintain the required tolerances.

To ensure that proper pan tolerances are maintained in the buildup area 174, it may be advantageous to weld sheets 164 and 168 together along the edges of the buildup area 174 along weld line 188. The weld line 188 help ensure that the pressure within pressure zone 184 does not force sheets 164 and 168 apart in the buildup area 174.

Depending upon the application, it may be advantageous to maintain different pressures in pressure zone 184 at different locations on the composite part. Welding the first sheet 164 and third sheet 168 together along a weld line defines different pressure zones between the sheets that may be pressurized at different pressures.

Holes are drilled in the build-up section 174 of the wing skin to receive fasteners 158 to join the spar 144 to the wing skin (FIG. 8).

While preferred embodiments of the invention has been illustrated and described, those skilled in the art will appreciate that various changes can be made therein without departing from the spirit and scope of the invention.

We claim:

1. A method for consolidating an organic matrix composite at a consolidation temperature comprising the steps of:
   (a) laying up prepreg, having a matrix selected from a group consisting of poly-ether-ether-ketone, epoxy, bismaleimide, and polyimide, to form an organic matrix composite panel;
   (b) placing the panel adjacent a susceptor susceptible to inductive heating, wherein the susceptor and panel form a workpiece;
   (c) inductively heating the susceptor by inducing eddy currents in the susceptor using an alternating magnetic field, wherein the eddy currents heat the susceptor, thereby to heat the panel to the consolidation temperature;
   (d) consolidating the panel at the consolidation temperature by applying pressure to the panel.

2. The method of claim 1 further comprising placing the workpiece between dies formed of a material not susceptible to inductive heating and passing the alternating magnetic field through the dies.

3. The method of claim 2, wherein step (d) comprises pressurizing a pressure zone between the workpiece and at least one of the dies to apply pressure to the workpiece.

4. The method of claim 2, wherein at least one of the dies includes a forming surface and wherein the method further comprises deforming the workpiece to a contour of the forming surface.

5. The method of claim 1, wherein the panel is sealed within the susceptor to define a vacuum pressure zone around the panel.

6. The method of claim 5, wherein the susceptor includes a second pressure zone on one side of the panel, and wherein the method further comprises pressurizing the second pressure zone to apply pressure to the panel to aid the consolidation.

7. The method of claim 1 wherein the magnetic field is produced with an induction coil, and wherein the workpiece is positioned substantially symmetric around the centerline of the coil to achieve temperature uniformity.

8. The method of claim 1 wherein the alternating magnetic field is produced using an alternating current in an induction coil operating at a frequency of about 3–10 kHz.

9. The method of claim 1 wherein the pressure is about 250 psi.

10. The method of claim 1 wherein the workpiece includes a first pressure zone surrounding the panel and defined by a first and second sheet of susceptor material sealed around their periphery to confine the panel within the first pressure zone and wherein the workpiece further includes a second pressure zone defined by the second sheet and a third sheet of susceptor material and wherein the method further comprising the steps of pulling a vacuum in the first pressure zone to reduce voids, wrinkles, and flaws in the panel and pressurizing the second pressure zone to apply the pressure to the panel during the consolidating step.

11. The method of claim 1, further comprising deforming the susceptor and panel against a forming surface of a die to produce a formed, completed composite having a shape corresponding to the forming surface.

12. A method for consolidating and forming an organic matrix composite and at an elevated consolidation temperature comprising the steps of:

(a) laying up a panel formed of an organic matrix composite as a flat sheet of at least one layer of prepreg;

(b) placing the panel within a susceptor to form a workpiece, the susceptor being susceptible to inducting heating in the presence of a time-varying magnetic field;

(c) confining the workpiece between dies formed of a material not susceptible to inductive heating;

(d) creating a time-varying magnetic field around the workpiece to inductively heat the susceptor and thereby to heat the panel to a consolidation temperature of the organic matrix composite panel by conduction of heat from the susceptor to the panel;

(e) at least partially evacuating a pressure zone within the susceptor around the panel to reduce voids, wrinkles, and flaws in the panel;

(f) applying a pressure to at least one side of the workpiece; and (g) consolidating the panel under the applied pressure at the consolidation temperature.

13. The method of claim 12 wherein (i) the organic matrix composite is selected from the group consisting of poly-ether-ether-ketone, epoxy, bismaleimide, and polyimide;

(ii) the time-varying magnetic field is substantially uniform around the workpiece to create a substantially uniform temperature in the susceptor;

(iii) the magnetic field is produced using an alternating current flowing in an induction coil at a frequency of about 3–10 kHz; and (iv) the susceptor is aluminum.

14. The method of claim 13 wherein the pressure is approximately 250 psi and the consolidation temperature is about 720° F.

15. A method for consolidation an organic matrix prepreg under heat and pressure to an organic matrix composite, comprising the steps of:

(a) sealing a prepreg between at least two sheets of a material susceptible to induction heating;

(b) exposing the susceptible material to an alternating magnetic flied to induce eddy currents in the material and, thereby, to heat the material substantially uniformly;

(c) heating the prepreg substantially uniformly by conduction of heat from the susceptible material to the prepreg to raise the prepreg to a consolidation temperature at which the organic matrix prepreg flows to form the organic composite matrix; and (d) while maintaining the prepreg at the consolidation temperature, applying pressure to the prepreg.

16. The method of claim 15 further comprising the steps of simultaneously deforming the prepreg and susceptible material while maintaining the consolidation temperature and pressure to produce a formed composite of predetermined shape.

17. A method for consolidating an organic matrix composite at a consolidation temperature comprising the steps of:

(a) laying-up prepreg to form an organic matrix composite panel;

(b) placing the panel adjacent a susceptor susceptible to inductive heating and sealing the panel within the susceptor to define a vacuum pressure zone around the panel, wherein the susceptor and panel form a workpiece;

(c) inductively heating the susceptor by inducing eddy currents in the susceptor using an alternative magnetic field, wherein the eddy currents heat the susceptor, thereby heating the panel by conduction to the consolidation temperature;

(d) consolidating the panel at the consolidating temperature by applying pressure to the panel.

18. The method of claim 17, wherein the susceptor includes a second pressure zone on one side of the panel, and wherein the method further comprises pressurizing the second pressure zone to apply pressure to the panel to aid the consolidation.

19. A method for consolidating an organic matrix composite at a consolidating temperature comprising the steps of;

(a) laying-up prepreg to form an organic matrix composite panel;

(b) placing the panel adjacent a susceptor susceptible to inductive heating, wherein the susceptor and panel form a workpiece;

(c) inductively heating the susceptor with an alternating magnetic field produced with an induction coil, wherein the workpiece is positioned substantially symmetric around the centerline of the induction coil and wherein the magnetic field induces eddy currents in the susceptor that heat the susceptor and wherein the susceptor conductively heats the panel to the consolidation temperature; and (d) consolidating the panel at the consolidation temperature by applying pressure to the panel.

20. A method for consolidating an organic matrix composite at a consolidation temperature comprising the steps of:

(a) laying-up prepreg to form an organic matrix composite panel;

(b) placing the panel adjacent a susceptor susceptible to inductive heating, wherein the susceptor and panel form a workpiece;

(c) inductively heating the susceptor by inducing eddy currents in the susceptor using an alternating magnetic field, wherein the eddy current heats the susceptor, thereby heating the panel to the consolidation temperature;

(d) consolidating and deforming the panel against a forming surface of a die when at the consolidation temperature by applying a pressure to the panel to deform the susceptor and panel against the forming surface.

\* \* \* \* \*

UNITED STATES PATENT AND TRADEMARK OFFICE
CERTIFICATE OF CORRECTION

PATENT NO. : 5,530,227
DATED : June 25, 1996
INVENTOR(S) : M.R. Matsen et al.

It is certified that error appears in the above-indentified patent and that said Letters Patent is hereby corrected as shown below:

On the title page, items:

[56]　　Refs. Cited　Insert following references:
　　　　(U.S. Pat.　　--4,984,348　1/1991　Cadwell . . . . . 29/423
　　　　　Docs.)　　　　5,016,805　5/1991　Cadwell . . . . . 228/118--

[56]　　Refs. Cited　Insert following references:
　　　　(U.S. Pat.　　--4,673,450　6/1987　Burke . . . . . . . . 156/153
　　　　　Docs.)　　　　5,338,497　8/1994　Murray et al. . . . . 264/25--

Signed and Sealed this

Fifth Day of November, 1996

Attest:

BRUCE LEHMAN

Attesting Officer　　　　Commissioner of Patents and Trademarks